Sept. 18, 1923.  
O. WINTER  
1,468,548  
INDICATOR FOR FORCED LUBRICATION SYSTEMS  
Filed July 14, 1920
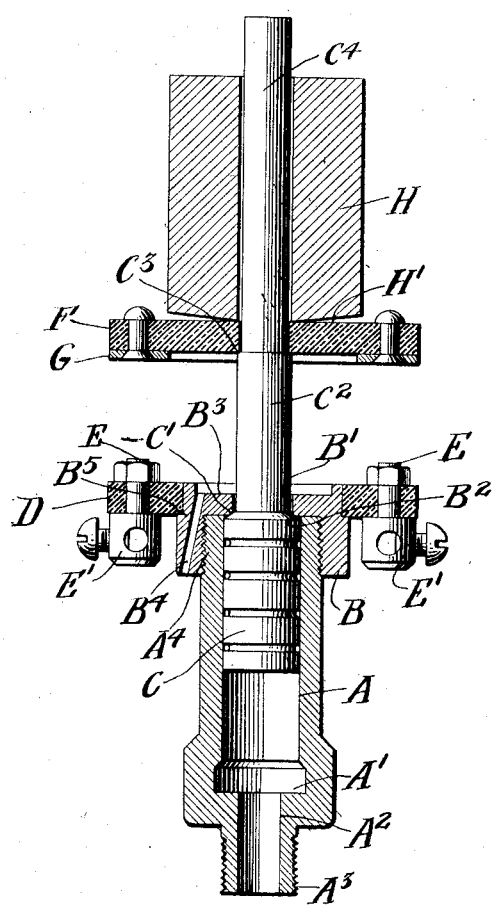
WITNESS  
Gustav Genzlinger.
INVENTOR  
Oscar Winter  
BY  
his ATTORNEY Patented Sept. 18, 1923.

1,468,548

UNITED STATES PATENT OFFICE.

OSCAR WINTER, OF WOODBURY, NEW JERSEY, ASSIGNOR TO ANDALE ENGINEERING COMPANY, OF PHILADELPHIA, PENNSYLVANIA, A CORPORATION OF PENNSYLVANIA.

INDICATOR FOR FORCED-LUBRICATION SYSTEMS.

Application filed July 14, 1920. Serial No. 396,229.

*To all whom it may concern:*

Be it known that I, OSCAR WINTER, a citizen of the United States of America, and resident of Woodbury, in the county of Gloucester and State of New Jersey, have invented a certain new and useful Improvement in Indicators for Forced-Lubrication Systems, of which the following is a true and exact description, reference being had to the accompanying drawings, which form a part thereof.

My invention relates to indicators for forced lubrication systems and has for its object to provide an exceedingly simple and effective indicating device of such character that its getting out of order or jamming are risks which are practically eliminated.

The nature of my invention will be best understood as described in connection with the drawing in which it is illustrated and which is a sectional elevation of my device.

A is a cylinder having, as shown, a somewhat enlarged lower end A' and a threaded nipple $A^3$ by which it is secured to a pipe in the lubrication system. The top of the cylinder A is threaded as indicated at $A^4$. B is a plate or block constituting the cylinder head and screwing on the top of the cylinder as indicated. It is formed with a central perforation or opening as indicated at B'. At the lower edge of this opening B' is formed a valve seat $B^2$; the head B is also formed with an external annular seat $B^5$ and an annular oil receiving chamber $B^3$ in its top from which leads an oil duct indicated at $B^4$. C is the piston or plunger working in the cylinder A which is preferably made longer, as shown, and formed with annular grooves. This piston works loosely in the cylinder A and has at its top an annular valve C' which, when the piston is raised, fits against the valve seat $B^2$ on the head. $C^2$ indicates the piston rod extending upward through the opening B' and formed with an annular seat $C^3$ above which the rod is of smaller diameter as indicated at $C^4$. D is an annular ring of non-conducting material which rests on the seat $B^5$ of the block B and to which are attached the contact points E having secured to them, as shown, the plugs E' to which the line wires are attached. F is an annular ring of non-conducting material resting on the annular shoulder $C^3$ of the piston rod and supporting an annular contact ring G. H is a weight of generally cylindrical form but preferably round at bottom as indicated at H'. This weight is perforated so as to pass over the portion $C^4$ of the spindle or piston rod and this round end rests upon the plate F. The weight H together with the weight of the piston rod and other attached parts, is such as will nearly but not quite counterbalance the normal oil pressure acting on the bottom of the piston and as long as the piston is in its uppermost position escape of oil from the cylinder A is prevented by the contact of the valve C with the valve seat $B^2$. The fall of pressure in the oil pipe below the danger point will permit the weight of the piston to move down to the bottom of the cylinder and bring the contact ring G into contact with the terminals E, E, closing the circuit in the line wires not illustrated which may be made to give any desired signal. Any oil which may escape from the cylinder while the valve C' is out of contact with its seat will be caught in the chamber $B^3$ and escape through the duct $B^4$, thus protecting the terminals E.

The simplicity of my device is, of course, apparent. All the movable parts can be twirled or turned and the piston readily depressed to test the indicating device.

Having now described my invention, what I claim as new and desire to secure by Letters Patent, is:

1. An indicator for forced lubrication system consisting of a cylinder adapted to be attached at its bottom to an oil conduit and to extend vertically upward therefrom, in combination with a loosely fitting piston having an annular valve at its upper end and a piston rod also extending upward from its end, a cylinder head having an opening for the piston rod and an annular valve seat for the valve on the piston, means for weighting the piston attached to the piston rod above the cylinder and a circuit closer located above the cylinder actuated by the piston rod and arranged to close the circuit when the piston falls.

2. An indicator for forced lubrication system consisting of a cylinder adapted to be attached at its bottom to an oil conduit and to extend vertically upward therefrom, in combination with a loosely fitting piston having an annular valve at its upper end and a piston rod also extending upward from its end, a cylinder head having an opening for the piston rod and an annular valve seat for the valve on the piston, said piston head having an oil receiving chamber on its top and an oil duct leading from said chamber, means for weighting the piston attached to the piston rod, and a circuit closer actuated by the piston rod and arranged to close the circuit when the piston falls.

3. An indicator for forced lubrication system consisting of a cylinder adapted to be attached at its bottom to an oil conduit and to extend vertically upward therefrom, in combination with a loosely fitting piston having an annular valve at its upper end and a piston rod also extending upward from its end, said piston and piston rod and part supported thereby being freely rotatable, a cylinder head having an opening for the piston rod and an annular valve seat for the valve on the piston, said cylinder head having an annular shoulder formed on its outer edge, a non-conducting ring resting on said ledge and supporting electric line terminals, a non-conducting ring supported on the piston rod supporting a contact ring on its lower side and a perforated circular weight surrounding the piston rod and resting on the ring supported thereby.

OSCAR WINTER.